US008737226B2

(12) United States Patent
Liang et al.

(10) Patent No.: US 8,737,226 B2
(45) Date of Patent: May 27, 2014

(54) METHOD FOR TWO-STAGE PACKET AGGREGATION FACING WIRELESS SENSOR NETWORK OF HYBRID TOPOLOGY STRUCTURE

(75) Inventors: Wei Liang, Shenyang (CN); Haibin Yu, Shenyang (CN); Peng Zeng, Shenyang (CN); Xiaoling Zhang, Shenyang (CN); Zhijun Shang, Shenyang (CN); Miao Yang, Shenyang (CN); Weijie Xu, Shenyang (CN); Zhijia Yang, Shenyang (CN)

(73) Assignee: Shenyang Institute of Automation, Chinese Academy of Sciences, Shenyang (CN)

( * ) Notice: Subject to any disclaimer, the term of this patent is extended or adjusted under 35 U.S.C. 154(b) by 255 days.

(21) Appl. No.: 13/508,041

(22) PCT Filed: Dec. 11, 2009

(86) PCT No.: PCT/CN2009/075497
§ 371 (c)(1),
(2), (4) Date: May 3, 2012

(87) PCT Pub. No.: WO2011/017871
PCT Pub. Date: Feb. 17, 2011

(65) Prior Publication Data
US 2013/0089003 A1    Apr. 11, 2013

(30) Foreign Application Priority Data
Aug. 12, 2009    (CN) .......................... 2009 1 0013094

(51) Int. Cl.
*G01R 31/08* (2006.01)
(52) U.S. Cl.
USPC ........................... 370/235; 370/310; 370/351

(58) Field of Classification Search
None
See application file for complete search history.

(56) References Cited

U.S. PATENT DOCUMENTS

| | | | |
|---|---|---|---|
| 6,438,137 B1 * | 8/2002 | Turner et al. .................. | 370/466 |
| 6,973,269 B1 * | 12/2005 | Britz et al. ...................... | 398/51 |
| 7,027,400 B2 * | 4/2006 | O'Neill ......................... | 370/235 |
| 7,697,522 B2 * | 4/2010 | Kliger et al. .................. | 370/389 |
| 8,295,491 B2 * | 10/2012 | Armknecht et al. .......... | 380/281 |
| 8,379,589 B2 * | 2/2013 | Lin et al. ....................... | 370/330 |
| 8,457,106 B2 * | 6/2013 | Kim et al. ...................... | 370/351 |
| 2008/0130538 A1 * | 6/2008 | Raissinia et al. .............. | 370/310 |
| 2010/0195560 A1 * | 8/2010 | Nozaki et al. ................. | 370/315 |
| 2011/0182260 A1 * | 7/2011 | Sivakumar et al. ........... | 370/329 |

* cited by examiner

*Primary Examiner* — Robert Wilson
(74) *Attorney, Agent, or Firm* — Novick, Kim & Lee, PLLC; Allen Xue (57) ABSTRACT

A method for two-stage packet aggregation facing wireless sensor network with hybrid topology structure including: building various nodes in a wireless sensor network into a hybrid topology structure which combines the star topology and mesh topology; establishing a two-stage packet aggregation architecture for periodic sensor data based on the above described topology structure; determining the packet format, aggregating and disaggregating the two-stage packets based on the topology structure and aggregation architecture; according to the application, the aggregated nodes in the network configuring router nodes and aggregation attributes of the nodes; according to the aggregation attribute, the sensor nodes performing the first-stage aggregation and generates an first-stage aggregation packet; according to the aggregation attributes, the router node implementing second-stage aggregation and generating a second-stage aggregation packet; the aggregation nodes taking charge of disaggregating the aggregated packets. Embodiments of the invention adopt the above described hybrid topology structure, feature a two-stage packet aggregation method, decrease the overhead of packet-head, reduce the energy consumption of the nodes and inter-node interference, and save communication resources.

13 Claims, 8 Drawing Sheets

FIG. 1

| Attribute name | Valid value | Default value | Description |
| --- | --- | --- | --- |
| AGG_FLAG | 0~1 | 0 | Aggregation flag |
| MAX_PDU_SIZE | 0~0xFFFF | 40 | Maximum length of aggregated packet |
| AGG_PERIOD | 0~0xFF | 1 | Aggregation duration |
| AGG_WAIT_TIME | 0~0xFF | 1 | Maximum waiting time of aggregation |

| Packet header | Aggregated packet number | Sensor ID1 | Data length 1 | Data1 | ... | Sensor ID n | Data length n | Data n |
|---|---|---|---|---|---|---|---|---|
| | | First aggregated packet data | | | | Nth aggregated packet data | | |
| | | Payload | | | | | | |

| Packet header | Aggregated packet number | Sensor node address 1 | Packet length 1 | Aggregation flag of sensor node 1 | Data 1 | ... | Sensor node address m | Payload length m | Aggregation flag of sensor node m | Data m |
|---|---|---|---|---|---|---|---|---|---|---|
| | | First-level aggregated packet of first sensor node | | | | | First-level aggregated packet of mth sensor node | | | |
| | | Payload | | | | | | | | |

METHOD FOR TWO-STAGE PACKET AGGREGATION FACING WIRELESS SENSOR NETWORK OF HYBRID TOPOLOGY STRUCTURE

CROSS-REFERENCE TO RELATED APPLICATIONS

This application is a National Stage Appl. filed under 35 USC 371 of International Patent Application No. PCT/CN2009/075497 with an international filing date of Dec. 11, 2009, designating the United States, and further claims priority benefits to Chinese Patent Application No. 200910013094.5 filed Aug. 12, 2009.

BACKGROUND OF THE INVENTION

1. Field of the Invention

This invention relates to a method of aggregation of a two-level packet for hybrid topology wireless sensor network, which belongs to a wireless communication technology.

2. Description of the Related Art

Since $21^{st}$ century, with the rapid development of disciplines, such as MEMS (Micro-Electro-Mechanism System), computer, communication, and automation control and artificial intelligence, a new type of control networks—WSN (Wireless Sensor Network) comes into being.

WSN is an intelligent and autonomous monitoring and control network system, which consists of many ubiquitous tiny sensor nodes having communication and computing capabilities. These sensor nodes are densely planted in an unattended monitoring area and complete the assigned task according to the environment. WSN is a large scale, unattended, resource-limited distributed system and utilizes multi-hop peer communication, the network topology of which dynamically changes with self-organizing, autonomous, adaptive and other smart properties. If the Internet has changed the communication way among people, the WSN would merge the logical information world and the real physical world together, which will change the interaction way between people and nature. The emergence of WSNs has attracted worldwide attention.

However, energy consumption is a major problem of WSN. Packet aggregation, which can reduce the header overhead and the number of packets, becomes an effective energy-saving method. WSN for industrial monitoring and other applications requires the battery-powered nodes and the network lifetime must last 2 to 3 years. Therefore, the energy problem is more prominent. In addition, these applications have periodic characteristics and usually use hierarchical network topology. These networks are configurable and suitable for packet aggregation. Until now, there have been no two-level packet aggregation methods for such WSN applications.

SUMMARY OF THE INVENTION

For the requirement of energy-saving in WSN, the technical problem that the invention solves is to provide a method of aggregation of a two-level packet for hybrid topology WSNs, which aims at reducing the number of packets and the header overhead and improving the network lifetime while guaranteeing the lossless data transmission.

To solve the above technical problem, the technical scheme in this invention is described below.

The invention provides a method of aggregation of a two-level packet for a hybrid topology wireless sensor network comprising the following steps:
Building all the nodes in a wireless sensor network into a hybrid mesh and star topology;
Based on the above topology, establishing a two-level packet aggregation structure for periodic sensor data;
Based on the topology and aggregation structure, designing a packet format and realizing the packet aggregation/disaggregation according to the following steps:
configuring routing nodes and sensor nodes as well as aggregation attributes thereof by a sink node in the network;
according to the aggregation attributes, performing a first-level aggregation by the sensor nodes to yield first-level aggregation packets;
according to the aggregation attributes, performing a second-level aggregation by the routing nodes to yield second-level aggregation packets; and
disaggregating the aggregation packets by the sink node.

In a class of this embodiment, the hybrid mesh and star topology structure is as follows:
Star network: the routing nodes and the sensor nodes are deployed, which is also called a cluster; the sensor nodes communicate with only one routing node, but do not directly communicate with each other; and
Mesh network: the routing nodes and the sink node are deployed; the routing nodes communicate at least with one sensor node, the sink node, or one another routing node.

Among them, the sensor nodes that can be installed with multiple sensors are responsible for collecting application data; the routing nodes are responsible for forwarding the data from the sensor nodes to the sink node; the sink node is responsible for converging data from all sensor nodes in the network.

In a class of this embodiment, the two-level aggregation structure is described as follows:
First-level aggregation: if a sensor node has more than one sensor, it should decide whether or not to invoke the first-level packet aggregation mechanism according to the aggregation flag thereof; and
Second-level aggregation: if a routing node receives packets from more than one sensor nodes, it should decide whether or not to invoke the second-level packet aggregation mechanism according to the aggregation flag thereof.

In a class of this embodiment, the aggregation attributes comprise the aggregation flag, the maximum length of aggregation packet, and the aggregation duration. Among them, the aggregation flag is used to indicate whether a sensor node or a routing node supports the aggregation mechanism. The aggregation duration of a sensor node is the minimum data update rate among all sensors; the aggregation duration of a routing node is the minimum data update rate among all sensor nodes.

In a class of this embodiment, the first-level packer aggregation is performed as follows:
Determining whether the aggregation flag of a sensor node is valid. If the aggregation flag is valid, the number of sensors should be determined to be more than or less than one;
If the number of sensors is more than one, the sensor node aggregates packets from multiple sensors, and sends the aggregation packet to the routing node. The process of the first-level packet aggregation ends.

If the aggregation flag of a sensor node is invalid, the sensor node does not aggregate packets from sensors, and sends the non-aggregated packet to the routing node.

Otherwise, if the number of sensors is less than one, the sensor node sends the non-aggregated packets to the routing node.

In a class of this embodiment, the non-aggregated packet in a sensor node comprises a packet header and payload. The packet header at least comprises a source address, destination address, packet length, and aggregation flag. The payload is the data from one sensor and expressed by sensor ID and sensor data.

In a class of this embodiment, the first-level aggregation packet in a sensor node comprises a packet header and payload. The packet header at least comprises a source address, destination address, packet length, and aggregation flag. The payload comprises the number of the sensor nodes and the data from all sensor nodes. Each sensor data is expressed by sensor ID, data length, and data.

In a class of this embodiment, the second-level packer aggregation is performed as follows.

Determining whether the aggregation flag of a routing node is valid. If the aggregation flag is valid, the number of the sensor node in this cluster should be determined;

If the number of the sensor node in the cluster is more than one, the routing node should determine whether the packets are from their own cluster or from other cluster headers;

If packets are from their own cluster, the routing node performs the second-level packet aggregation function and aggregates these packets. Specifically, during one aggregation duration, the routing node uses the time when the first packet comes as the start time, and aggregates the packets after the maximum allowed aggregation time;

The routing node sends the aggregation packet to the sink node, and the process of the second-level aggregation ends.

If the aggregation flag in a routing node is invalid or there is only one sensor node in the cluster or packets are received from other clusters, the packets shall not been aggregated and be forwarded directly.

The format of the second-level aggregation packet comprises a packet header and payload. The packet header at least comprises a source address, destination address, packet length, and aggregation flag. The payload comprises the number of sensor nodes and the data from all sensor nodes. Each sensor data is expressed by address of sensor node, packet length, and data. Among them, if the sensor node supports aggregation mechanism, the data of the second-level aggregation packet is the payloads of the first-level aggregation packets; otherwise, the data of the second-level aggregation packet is the payload of the non-aggregated packets in the sensor nodes.

In a class of this embodiment, the disaggregation of the two-level packer is performed as follows:

After receiving a packet, the sink node first determines whether the packet is from a sensor node or from a routing node;

If the packet is from a routing node, the sink node determines whether to disaggregate this packet by performing the two-level disaggregation function according to the aggregation flag in the packet header;

If disaggregation is needed, the sink node disaggregates the second-level aggregation packet of the routing node;

During the disaggregation process, the sink node determines whether to disaggregate the data from sensor nodes according to each aggregation flag of each sensor node in the data field of the second-level aggregation packet;

If the data of sensor nodes needs disaggregation, the sink node disaggregates each first-level aggregation packet of the sensor nodes in the second-level aggregation packet. The process of the disaggregation ends.

In a class of this embodiment, if the aggregation flag in each sensor node indicates that the data from the sensor node need not be disaggregated, the sink node shall not perform the twice disaggregation and the whole disaggregation process ends.

In a class of this embodiment, if the aggregation flag in the packet header indicates that disaggregation is not needed, the process ends.

Otherwise, if the packet is from a sensor node, the sink node shall perform the disaggregation function according to the aggregation flag in the packet header to disaggregate the data from the sensor node. If the disaggregation is needed, the sink node shall disaggregate the first-level aggregation packet of the sensor node following the packet format; otherwise, the process ends.

The method of packet aggregation in this invention has fully considered the characteristics of industrial monitoring applications, which has the advantages of lossless aggregation, low power, and convenience for implementation. These advantages are specifically described as follows:

1. This invention uses a hybrid mesh and star topology structure. On the one hand, the star structure simplifies the network structure, reduces the difficulties of maintenance and management, and improves the system's flexibility; on the other hand, the mesh structure improves the reliability of the network;

2. This invention designs a two-level packet aggregation method, which reduces the communication number and header overhead. On the one hand, the energy consumption is reduced; on the other hand, the interference among nodes is reduced and the communication resources are saved; and 3. This invention designs a two-level packet disaggregation method, which is easy to be implemented.

DETAILED DESCRIPTION OF THE EMBODIMENTS

The method of this invention is described combing the attached diagrams in detail.

A method of aggregation of a two-level packet for hybrid topology wireless sensor network of this invention comprises the following steps.

Building all the nodes in a wireless sensor network into a hybrid mesh and star topology;

Based on the above topology, establishing a two-level packet aggregation structure for periodic sensor data;

Based on the topology and aggregation structure, designing a packet format and realizing the packet aggregation/disaggregation according to the following steps:

configuring routing nodes and sensor nodes as well as aggregation attributes thereof by a sink node in the network;

according to the aggregation attributes, performing a first-level aggregation by the sensor nodes to yield first-level aggregation packets;

according to the aggregation attributes, performing a second-level aggregation by the routing nodes to yield second-level aggregation packets; and disaggregating the aggregation packets by the sink node.

In this invention, the wireless sensor network comprises the following types of nodes: sensor nodes, routing nodes, and the sink node. The sensor nodes that can be installed with multiple sensors are responsible for collecting application data; the routing nodes are responsible for forwarding the data from the sensor nodes to the sink node; the sink node is responsible for converging data from all the sensor nodes in the network.

Figure 1:
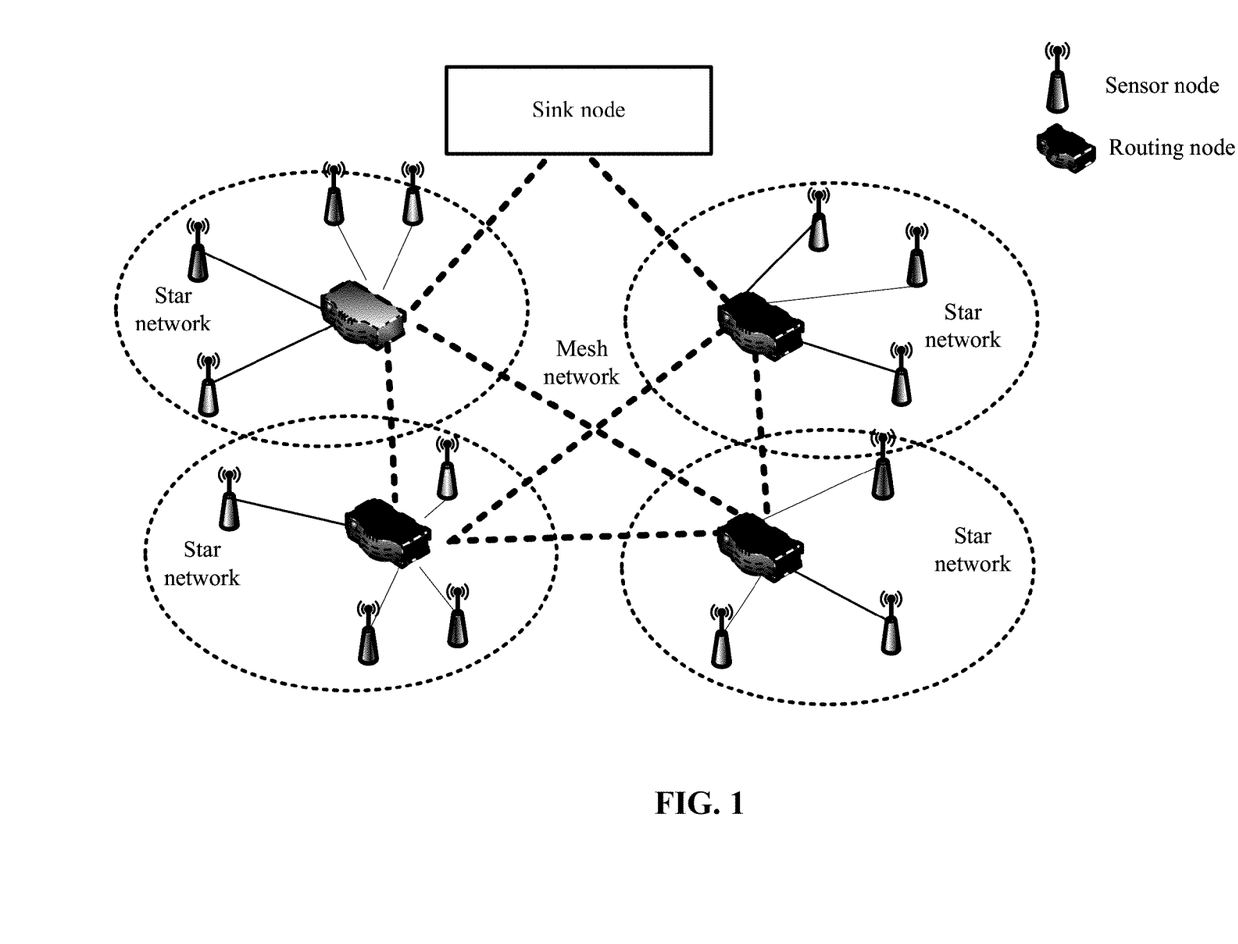
FIG. 1 is a schematic diagram of a hybrid mesh and star topology wireless sensor network.

The hybrid mesh and star topology structure is shown in FIG. 1, which comprises two-layers.

The first layer is a star network: the routing nodes and sensor nodes are deployed, which is also called a cluster; the routing nodes function as cluster headers, and the sensor nodes as members of the cluster; the sensor nodes communicate with only one routing node, but do not directly communicated with each other.

The second layer is a mesh network: the routing nodes and the sink node are deployed; a routing node communicates at least with one field node, the sink node, or one another routing node.

Oriented to the hybrid mesh and star topology and the periodic sensor data, the invention provides a two-level aggregation method. The basic structure of the two-level aggregation method is described as follows:

First-level aggregation: if a sensor node has more than one sensor, it should decide whether or not to invoke the first-level packet aggregation mechanism according to the aggregation flag. The first-level aggregation shall reduce the communication frequency and increase the network efficiency.

Second-level aggregation: if a routing node receives packets from more than one sensor nodes, it should decide whether or not to invoke the second-level packet aggregation mechanism according to the aggregation flag. The second-level aggregation shall decrease the number of packets from the routing nodes to the sink node and increase the network efficiency.

Figure 2:
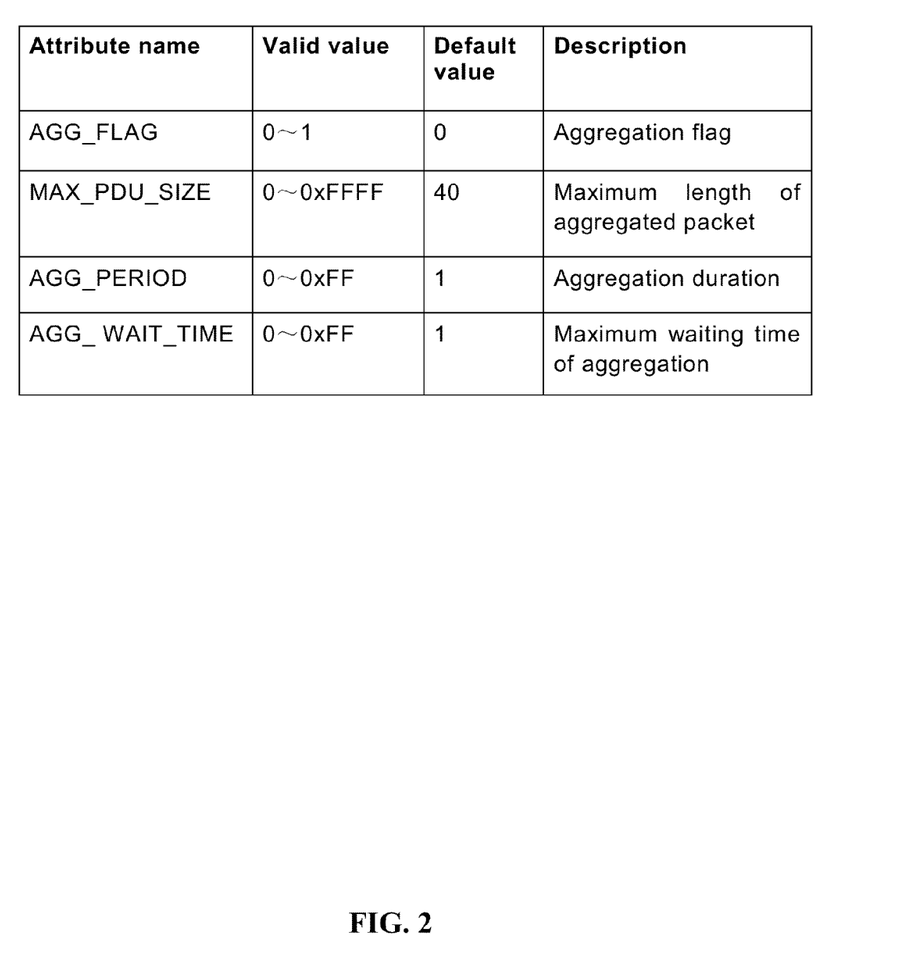
FIG. 2 is a schematic diagram of aggregation attributes.

The aggregation attributes are shown in FIG. 2, which comprise the aggregation flag, the maximum length of aggregation packet, the aggregation duration, and the maximum waiting time of aggregation. Among them, the aggregation flag is used to indicate whether a sensor node or a routing node supports the aggregation mechanism. If the value of the aggregation flag AGG_FLAG is one, the nodes will invoke the aggregation mechanism. Otherwise, the nodes will not invoke the aggregation mechanism. The aggregation duration of a sensor node is the minimum data update rate among all the sensors; the aggregation duration of a routing node is the minimum data update rate among all the sensor nodes.

Figure 3:
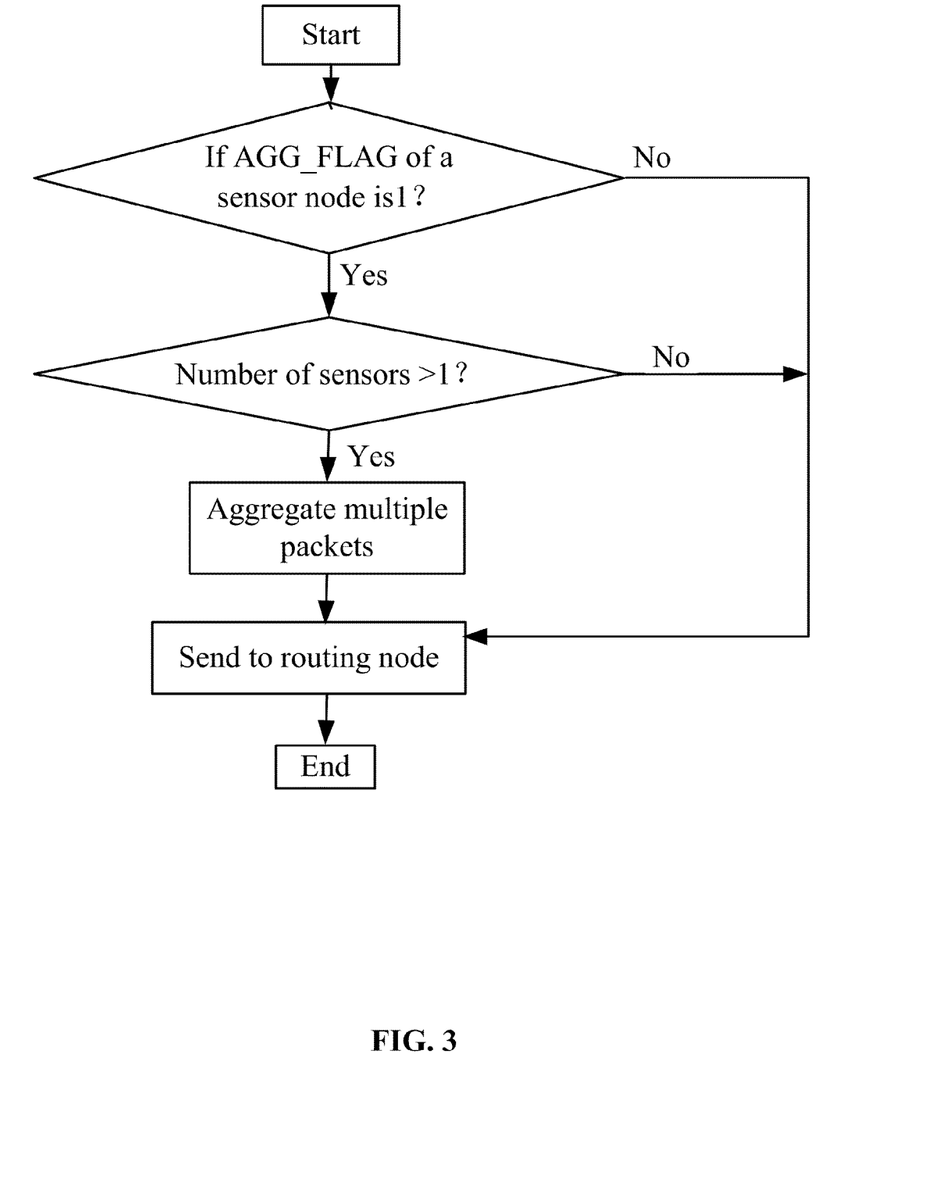
FIG. 3 is a flow chart of a first-level packet aggregation process.

The process of the first-level packer aggregation is shown in FIG. 3. The detailed process is invoked according to whether the aggregation function is enabled by the sensor nodes, which is listed as follows.

Determine whether the aggregation flag AGG_FLAG of a sensor node is valid, that is, is the value of AGG_FLAG one? If the aggregation flag is valid (if AGG_FLAG is set to 1), the number of the sensors should be determined to be more than or less than one.

If the number of the sensors is more than one, the sensor node aggregates packets from multiple sensors, and sends the aggregation packet to the routing node. The process of the first-level packet aggregation ends.

If the aggregation flag of a sensor node is invalid (that is, the value of AGG_FLAG is not one), the sensor node does not aggregate packets from sensors, and sends the non-aggregated packet to the routing node.

Otherwise, if the number of sensors is less than one, the sensor node sends the non-aggregated packets to the routing node.

Figure 4:
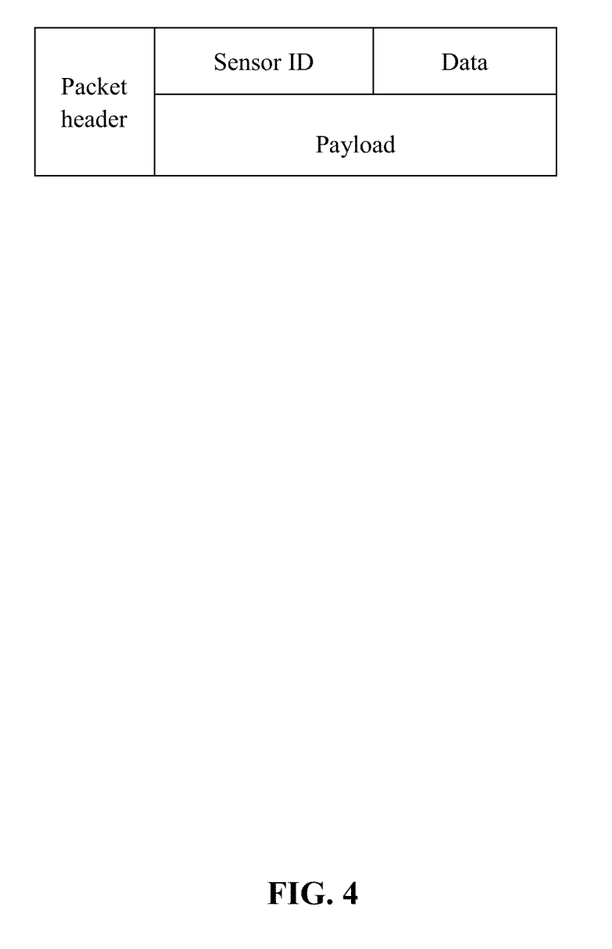
FIG. 4 is a schematic diagram of a non-aggregated packet format of a sensor node.

The format of the non-aggregated packet in a sensor node, which is shown in FIG. 4, comprises a packet header and payload. The packet header at least comprises a source address, destination address, packet length, and aggregation flag. The payload is the data from one sensor and expressed by sensor ID and sensor data.

Figure 5:
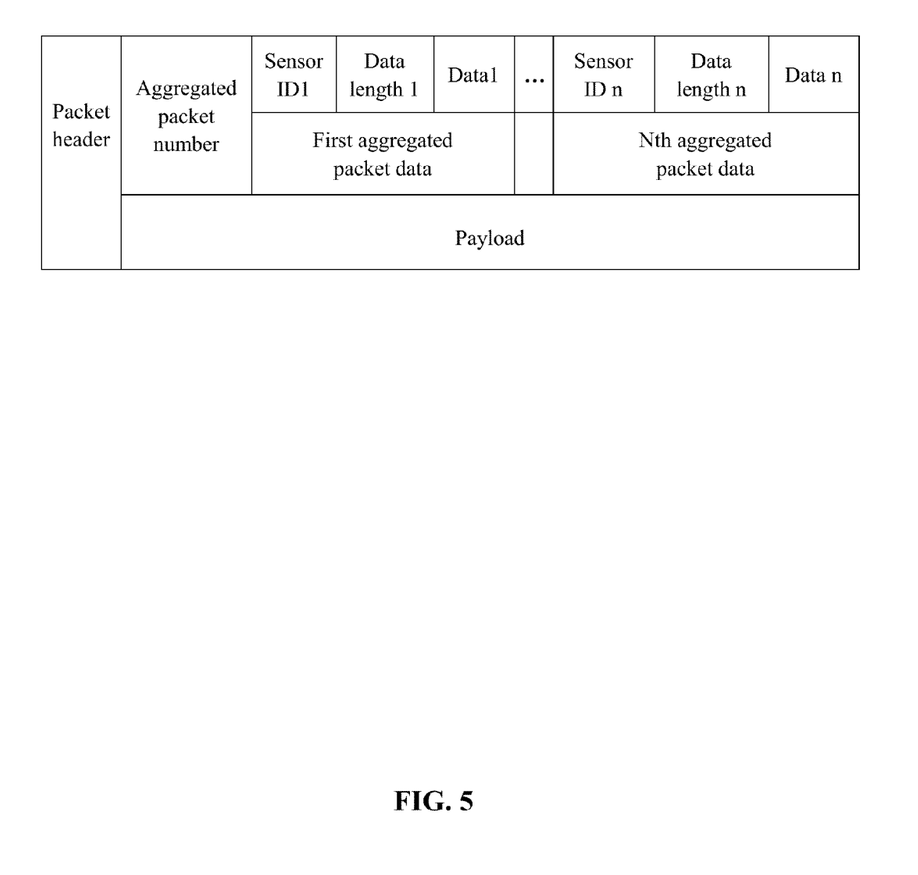
FIG. 5 is a schematic diagram of a first-level aggregation packet format.

The format of first-level aggregation packet in a sensor node, which is shown in FIG. 5, comprises a packet header and payload. The packet header at least comprises a source address, destination address, packet length, and aggregation flag. The payload comprises the number of sensor nodes and the data from all the sensor nodes. Each sensor data is expressed by sensor ID, data length, and data.

Figure 6:
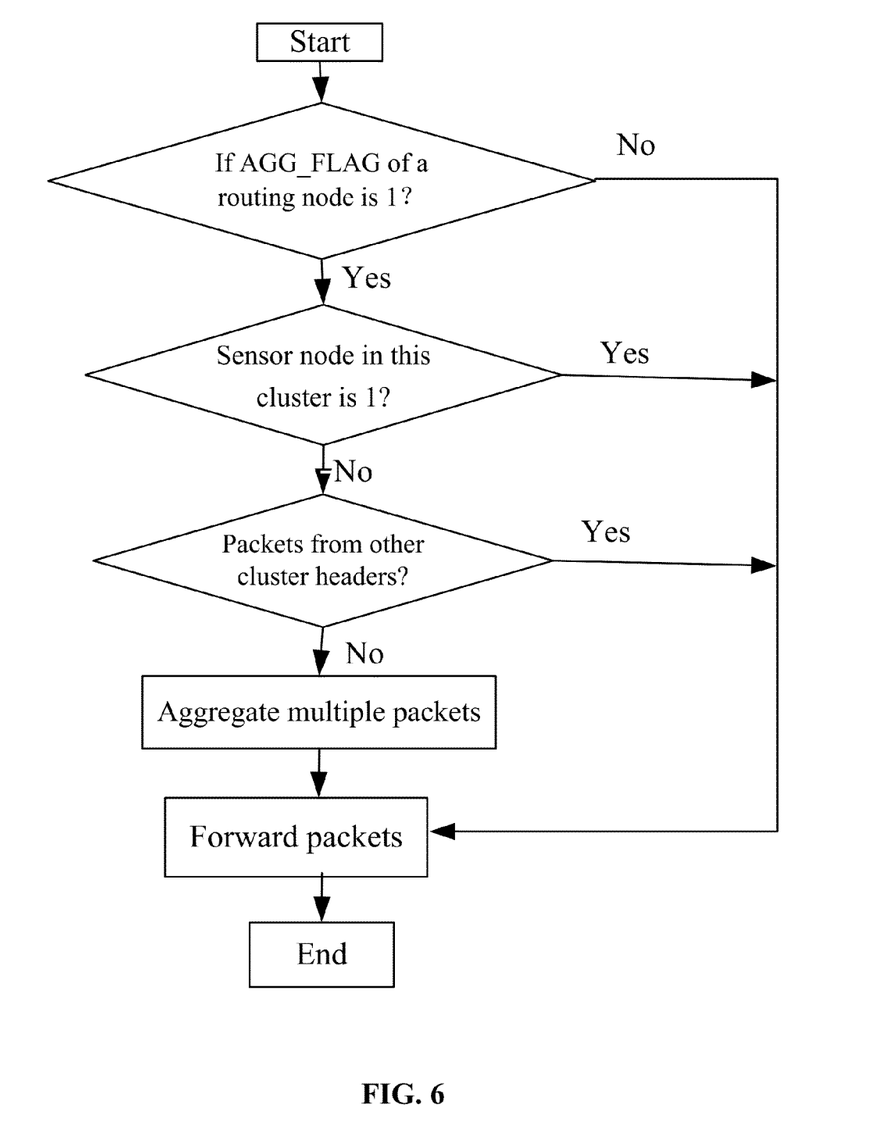
FIG. 6 is a flow chart of a second-level packet aggregation process.

The process of the second-level packer aggregation is shown in FIG. 6. The detailed process is invoked according to whether the aggregation function is enabled by the routing nodes, which is listed as follows.

Determine whether the aggregation flag AGG_FLAG of a routing node is valid, that is, is the value of AGG_FLAG one? If the aggregation flag is valid (if AGG_FLAG is set to 1), the number of sensors in this cluster should be determined to be more than or less than one.

If the number of the sensor node in a cluster is more than one, the routing node should determine whether the packets are from their own cluster or from other cluster headers.

If packets are from their own cluster, the routing node performs the second-level packet aggregation function and aggregates these packets. Specifically, during one aggregation duration, the routing node uses the time when the first packet comes as the start time, and aggregates the packets after the maximum waiting time of aggregation.

The routing node sends aggregation packet to the sink node, and the process of the second-level aggregation ends.

If the aggregation flag in a routing node is invalid (the value of AGG_FLAG is not one) or there is only one sensor node in the cluster or the packets are received from other clusters, the packets shall not been aggregated and be forwarded directly.

Figure 7:
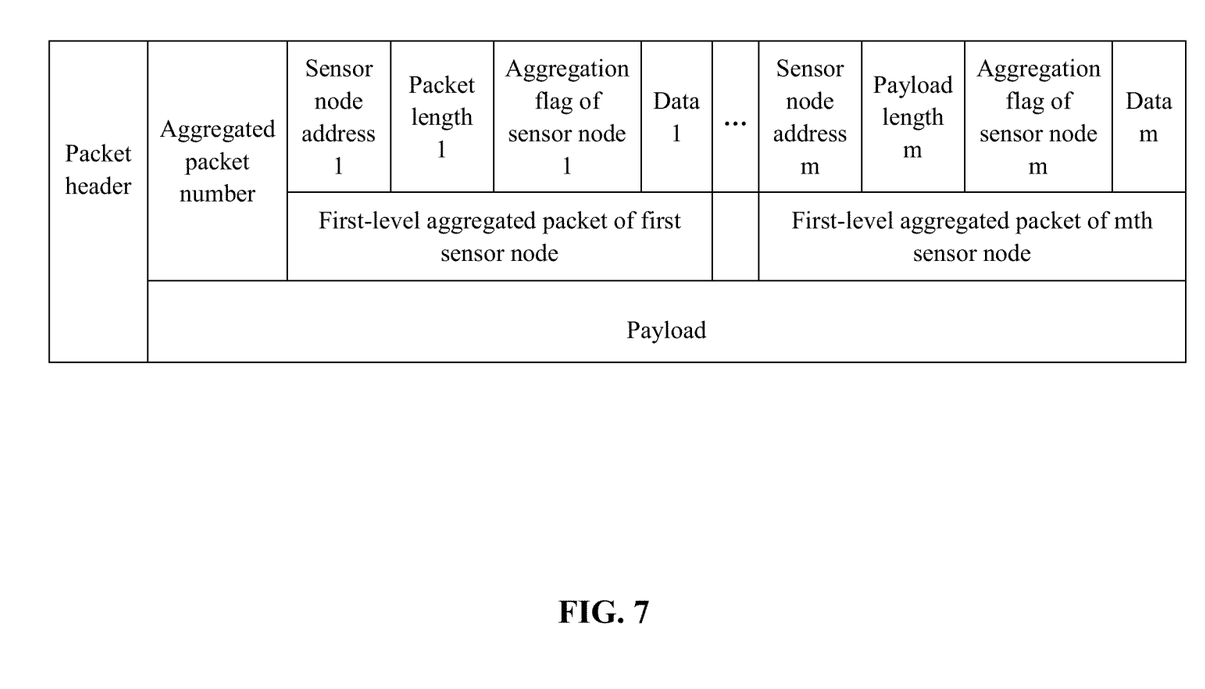
FIG. 7 is a schematic diagram of a second-level aggregation packet format.

The format of the second-level aggregation packet, which is shown in FIG. 7, comprises a packet header and payload. The packet header at least comprises a source address, destination address, packet length, and aggregation flag. The payload comprises the number of sensor nodes and the data from all sensor nodes. Each sensor data is expressed by address of sensor node, packet length, and data. Among them, if the sensor node supports aggregation mechanism, the data of the second-level aggregation packet is the payloads of the first-level aggregation packets; otherwise, the data of the second-level aggregation packet is the payload of the non-aggregated packets in sensor nodes.

Figure 8:
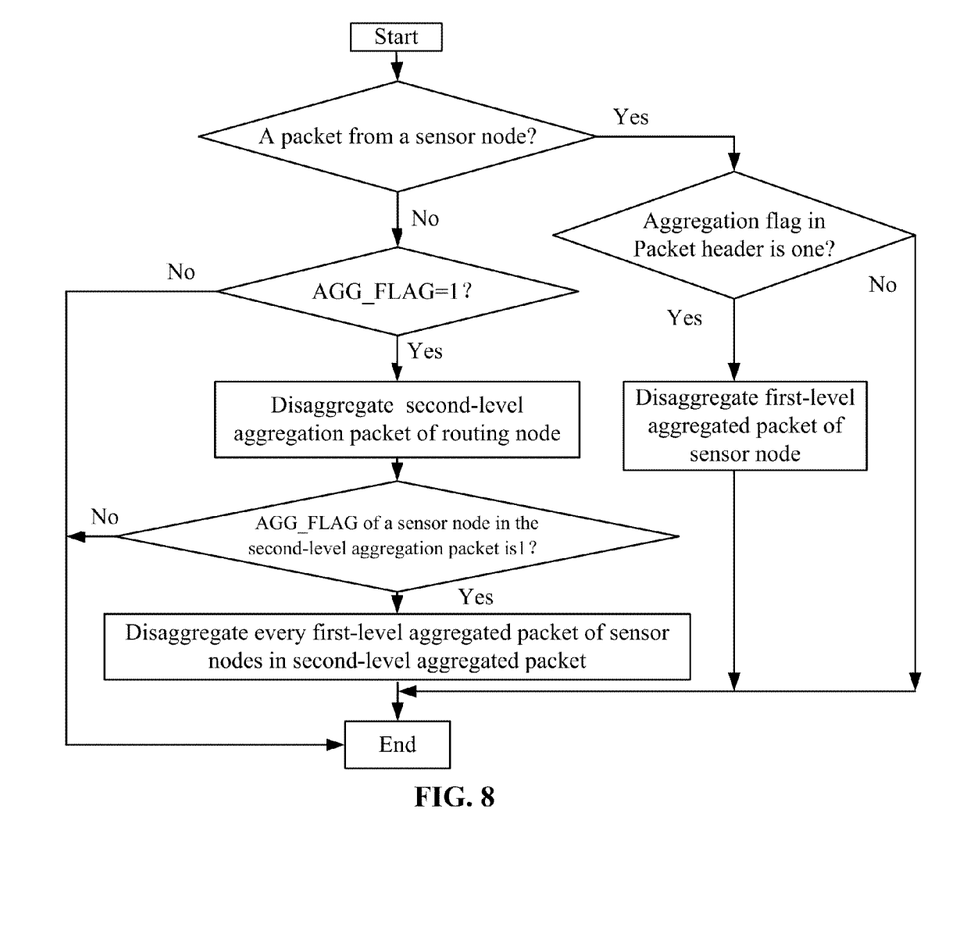
FIG. 8 is a schematic diagram of a packet disaggregation process.

The disaggregation of the two-level packer is shown in FIG. 8, which is performed as follows.

After receiving a packet, the sink node first determines whether the packet is from a sensor node or from a routing node.

If the packet is from a routing node, the sink node determines whether to disaggregate this packet by performing the two-level disaggregation function according to the aggregation flag in the packet header (if aggregation flag is set to one).

If disaggregation is needed (the aggregation flag=1), the sink node disaggregates the aggregation packet of the routing node.

The sink node determines whether to disaggregate the data from the sensor nodes according to each aggregation flag of each sensor node in the data field, that is, the sink node determines that whether the value of the aggregation flag of the sensor node is one.

If the data of the sensor nodes needs disaggregation (the value of the aggregation flag of the sensor node is one=1), the sink node disaggregates the aggregation packet of the sensor nodes. The process of the disaggregation ends.

If the aggregation flag in each sensor node indicates that the data from the sensor node need not be disaggregated (the value of the aggregation flag of the sensor node is one is not one), the sink node determines whether to disaggregate according to the aggregation flag in the packet header.

Otherwise, if the packet is from a sensor node, the sink node determines whether to disaggregate the packet of the sensor node according to the aggregation flag in the sensor node.

The disaggregation of the two-level packer is shown in FIG. 8, which is performed as follows.

After receiving a packet, the sink node first determines whether the packet is from a sensor node or from a routing node.

If the packet is from a routing node, the sink node determines whether to disaggregate this packet by performing the two-level disaggregation function according to the aggregation flag in the packet header (if aggregation flag is set to one).

If disaggregation is needed (the aggregation flag=1), the sink node disaggregates the second-level aggregation packet of the routing node.

During the disaggregation process, the sink node determines whether to disaggregate the data from the sensor nodes according to each aggregation flag of each sensor node in the data field of the second-level aggregation packet, that is, the sink node determines that whether the value of the aggregation flag of the sensor nodes is one.

If the data of the sensor nodes needs disaggregation (the aggregation flag of the sensor nodes=1), the sink node disaggregates each first-level aggregation packet of the sensor nodes in the second-level aggregation packet. The process of the disaggregation ends.

If the aggregation flag in each sensor node indicates that the data from the sensor node need not be disaggregated (the value of the aggregation flag of the sensor nodes is not one), the sink node shall not perform the twice disaggregation and the whole disaggregation process ends.

If the aggregation flag in the packet header indicates that disaggregation is not needed (the value of the aggregation flag of the sensor nodes is not one), the process ends.

Otherwise, if the packet is from a sensor node, the sink node shall perform the disaggregation function according to the aggregation flag in the packet header to disaggregate the data from the sensor node. If the disaggregation is needed (the aggregation flag of the sensor nodes=1), the sink node shall disaggregate the first-level aggregation packet of the sensor node following the packet format; otherwise, if the aggregation flag in the packet header is not one, the process ends.

The invention claimed is:

1. A wireless sensor network comprising:
    a plurality of nodes configured to receive wireless packets, wherein the plurality of nodes comprises a sink node, a plurality of routing nodes, and a plurality of sensor nodes
    wherein a sensor node of the plurality of sensor nodes is configured to perform a first-level aggregation to yield first level aggregation packets based on a plurality of aggregation attributes,
    wherein a routing node of the plurality of routing nodes is configured to perform a second-level aggregation to yield second-level aggregation packets based on the plurality of aggregation attributes,
    wherein the sink node is configured to disaggregate the first-level and the second-level aggregated packets,
    wherein the plurality of nodes are configured in a hybrid topology that comprises a mesh network and a plurality of star networks,
        wherein each start network of the plurality of star networks comprises one routing node interconnected with a group of sensor nodes of the plurality of sensor nodes, wherein each sensor node within the group of sensor nodes communicates only with the one routing node and does not directly communicate with any other sensor node,
        wherein the mesh network comprises the plurality of routing nodes and the sink node, wherein communications between the plurality of routing nodes and the sink node occur only via the mesh network.

2. The wireless sensor network of claim 1, wherein according to the first-level aggregation, when a sensor node has more than one sensor, the wireless sensor network is configured to determine whether or not to invoke a first-level packet aggregation mechanism; and according to the second-level aggregation when a routing node receives packets from more than one sensor nodes, the wireless sensor network is configured to determine whether or not to invoke a second-level packet aggregation mechanism.

3. The wireless sensor network of claim 1, wherein the plurality of aggregation attributes comprises an aggregation flag, a maximum length of aggregation packet, and a aggregation duration,
    wherein the aggregation flag indicates whether a sensor node or a routing node supports an aggregation mechanism, wherein the aggregation duration of a sensor node is the minimum data update rate among all sensors, and the aggregation duration of a routing node is the minimum data update rate among all sensor nodes.

4. The wireless sensor network of claim 3, wherein the first-level packet aggregation is performed according to one or more of the following steps:
    determining whether the aggregation flag of a sensor node is valid;
    when the aggregation flag is valid, determining the number of sensors to be more than or less than one;

when the number of sensors is more than one, the sensor node aggregates packets from multiple sensors, and sends the aggregation packet to the routing node; and completing a round of aggregation.

5. The wireless sensor network of claim 4, wherein when the aggregation flag of a sensor node is invalid, the sensor node does not aggregate packets from the sensor, and sends the non-aggregated packets to the routing node; and when the number of sensors is less than one, the sensor node sends the non-aggregated packets to the routing node.

6. The wireless sensor network of claim 5, wherein the non-aggregated packet in a sensor node comprises a packet header and a packet payload; the packet header comprises a source address, a destination address, a packet length, and an aggregation flag; and the payload is the data from one sensor and is expressed by sensor ID and sensor data.

7. The wireless sensor network of claim 3, wherein the second-level packet aggregation is performed according to one or more of the following steps:
   determining whether the aggregation flag of a routing node in a first star network is valid,
   when the aggregation flag is valid, determining the number of the sensor node in the first star network;
   when the number of the sensor node in the first star network is more than one, the routing node determine whether the packets are from the first star network or from other another star network;
   when packets are from the first star network, the routing node performs the second-level packet aggregation function and aggregates these packets;
   during one aggregation duration, the routing node uses the time when the first packet arrives as the start time, and aggregates the packets after the maximum allowed aggregation time; and
   the routing node sends the aggregation packet to the sink node, and the process of the second-level aggregation ends.

8. The wireless sensor network of claim 7, wherein when the aggregation flag in a routing node is invalid, or there is only one sensor node in the first star network, or packets are received from another star network, the packets are not aggregated and be forwarded directly.

9. The wireless sensor network of claim 1, wherein the first-level aggregation packet in a sensor node comprises a packet header and a packet payload; the packet header comprises a source address, a destination address, a packet length, and an aggregation flag; and the payload comprises the number of the sensor nodes and the data from all sensor nodes; and each sensor data is expressed by sensor ID, data length, and data.

10. The wireless sensor network of claim 1, wherein the second-level aggregation packet comprises a packet header and a packet payload; the packet header at least comprises a source address, a destination address, a packet length, and an aggregation flag; the payload comprises the number of sensor nodes and the data from all sensor nodes; each sensor data is expressed by the address of sensor node, the packet length, and the data; and wherein the sensor node supports aggregation mechanism, the data of the second-level aggregation packet is the payloads of the first-level aggregation packets; otherwise, the data of the second-level aggregation packet is the payload of the non-aggregated packets in the sensor nodes.

11. The wireless sensor network of claim 1, wherein the disaggregation of the first-level and the second-level packets is performed according to one or more of the following steps:
   after receiving a packet, the sink node first determines whether the packet is from a sensor node or from a routing node;
   when the packet is from a routing node, the sink node determines whether to disaggregate this packet by performing the two-level disaggregation function according to the aggregation flag in the packet header;
   when disaggregation is needed, the sink node disaggregates the second-level aggregation packet of the routing node;
   during the disaggregation process, the sink node determines whether to disaggregate the data from sensor nodes according to each aggregation flag of each sensor node in the data field of the second-level aggregation packet; and
   when the data of sensor nodes needs disaggregation, the sink node disaggregates each first-level aggregation packet of the sensor nodes in the second-level aggregation packet, and the process of the disaggregation ends.

12. The wireless sensor network of claim 11, wherein when the aggregation flag in each sensor node indicates that the data from the sensor node need not be disaggregated, the whole disaggregation process ends; and when the aggregation flag in the packet header indicates that disaggregation is not needed, the process ends.

13. The wireless sensor network of claim 11, wherein when the packet is from a sensor node, the sink node performs the disaggregation function according to the aggregation flag in the packet header to disaggregate the data from the sensor node; and when the disaggregation is needed, the sink node disaggregates the first-level aggregation packet of the sensor node following the packet format; otherwise, the process ends.

* * * * *